(12) United States Patent
Hirota

(10) Patent No.: US 6,967,623 B2
(45) Date of Patent: Nov. 22, 2005

(54) ELECTRONIC APPARATUS HAVING AN ANTENNA WITH VARIABLE DIELECTRIC TO OPTIMIZE RADIO COMMUNICATIONS AT DIFFERENT FREQUENCIES

(75) Inventor: Toshiyuki Hirota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 37 days.

(21) Appl. No.: 10/776,801

(22) Filed: Feb. 10, 2004

(65) Prior Publication Data

US 2004/0160371 A1 Aug. 19, 2004

(30) Foreign Application Priority Data

Feb. 14, 2003 (WO) .............................. PCT/JP03/01537

(51) Int. Cl.[7] .............................................. H01Q 1/24
(52) U.S. Cl. .............................. 343/702; 343/700 MS
(58) Field of Search ........................ 343/700 MS, 702

(56) References Cited

U.S. PATENT DOCUMENTS

| | | | | |
|---|---|---|---|---|
| 6,342,863 B2 | * | 1/2002 | Kitamori et al. | ............ 343/767 |
| 6,437,747 B1 | * | 8/2002 | Stoiljkovic et al. | ......... 343/702 |
| 6,781,562 B1 | * | 8/2004 | Lungwitz | .................... 343/900 |
| 6,856,286 B2 | * | 2/2005 | Jo et al. | .............. 343/700 MS |

FOREIGN PATENT DOCUMENTS

| | | |
|---|---|---|
| JP | 04-330806 | 11/1992 |
| JP | 05-003409 | 1/1993 |
| JP | 09-069717 | 3/1997 |
| JP | 09-162632 | 6/1997 |
| JP | 11-136023 | 5/1999 |
| JP | 2001-345626 | 12/2001 |
| JP | 2002-190708 | 7/2002 |
| JP | 2002-232319 | 8/2002 |
| JP | 2003-037416 | 2/2003 |

* cited by examiner

*Primary Examiner*—Tho Phan
(74) *Attorney, Agent, or Firm*—Foley & Lardner LLP

(57) ABSTRACT

An electronic apparatus has a first radio module configured to use a first frequency band, a second radio module configured to use a second frequency band which is different from the first frequency band, an antenna coupled to both the first radio module and the second radio module, a dielectric material, and a mechanism configured to relatively move the dielectric material with respect to said antenna so that an interval between the antenna and the dielectric material is changed between a first interval for the first radio module and a second interval for the second radio module.

19 Claims, 8 Drawing Sheets

ELECTRONIC APPARATUS HAVING AN ANTENNA WITH VARIABLE DIELECTRIC TO OPTIMIZE RADIO COMMUNICATIONS AT DIFFERENT FREQUENCIES

CROSS-REFERENCE TO RELATED APPLICATIONS

This application is based upon and claims the benefit of priority from PCT International Application No. PCT/JP03/01537, filed Feb. 14, 2003, the entire contents of which are incorporated herein by reference.

BACKGROUND OF THE INVENTION

1. Field of the Invention

This invention relates to an electronic apparatus, e.g. a portable computer, including an antenna for radio communication.

2. Description of the Related Art

In recent years, for electronic apparatuses such as a personal computer, apparatuses including radio communication devices such as a wireless LAN and Bluetooth (R) have become popular. In this type of radio communication system, radio waves, for example, of a 2.5 GHz or 5 GHz band are used. Moreover, as antennas for radio communication, various antennas such as a dipole antenna, helical antenna, slot antenna, and inverted F-shaped antenna are used for each type of Additionally, a resonance frequency of the antenna is determined by shape, size, and peripheral environment of the antenna. Usually, a certain resonance frequency band is allocated to one antenna. Therefore, when a plurality of radio modules having different frequency bands from one another are used, a plurality of antennas have to be installed for these respective radio modules, and a problem of installation space occurs.

In relation to a solution of this problem, Japanese Patent Application Publication (KOKAI) No. 2002-190708 discloses a dual band antenna in which two resonance frequencies are imparted to one antenna, and a triple band antenna in which three resonance frequencies are imparted.

However, there is a limitation in the resonance frequency which may structurally be covered by one antenna, and with a predetermined number of (e.g., three or more) frequencies, the antenna size becomes very large, and the antenna shape also becomes complicated. Furthermore, when a plurality of resonance frequencies are assigned to one antenna, a usable frequency band is narrowed.

BRIEF SUMMARY OF THE INVENTION

Embodiments of the present invention provide an electronic apparatus switching a resonance frequency of an antenna for each radio module.

According to an embodiment of the present invention, an electronic apparatus has a first radio module configured to use a first frequency band, a second radio module configured to use a second frequency band which is different from the first frequency band, and an antenna coupled to both the first radio module and the second radio module. The electronic apparatus further includes a dielectric material, and a mechanism configured to relatively move said dielectric material with respect to the antenna so that an interval between the antenna and the dielectric material is changed between a first interval for the first radio module and a second interval for the second radio module.

Additional features and advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Preferred embodiments according to the present invention will be described hereinafter with reference to the accompanying drawings.

Figure 1:
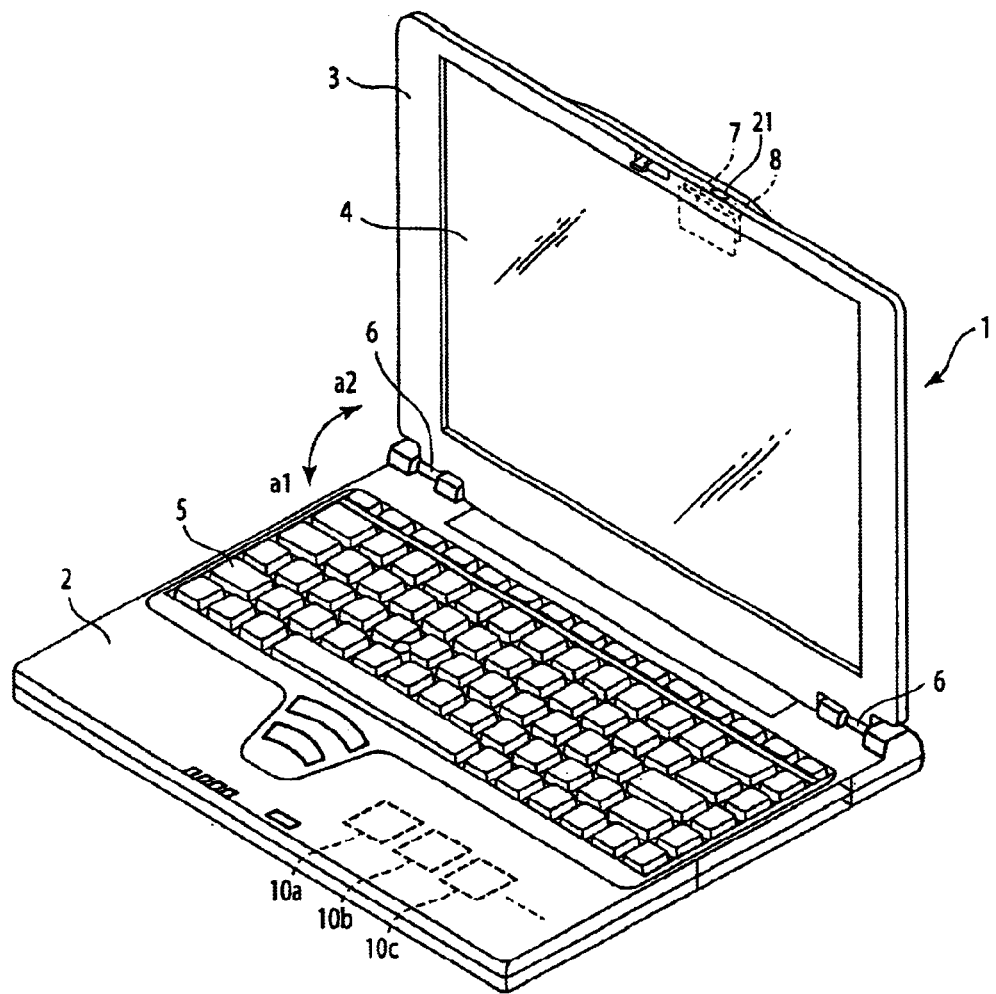
FIG. 1 is a perspective view showing a portable computer according to a first embodiment of the present invention.

FIG. 1 shows a portable computer 1 as an electronic apparatus in the first embodiment.

The portable computer 1 includes a main unit 2, display unit 3, liquid crystal display panel (hereinafter "LCD panel") 4, and keyboard 5. The keyboard 5 is disposed in an upper surface of the main unit 2.

The main unit 2 and the display unit 3 are rotatably connected to each other via hinge portions 6. The display unit 3 supports a peripheral portion of the LCD panel 4 so that a display region of the LCD panel 4 is brought in a visible state by opening the portable computer 1.

The display unit 3 may rotate along an arrow a1–a2 direction via the hinge portions 6. That is, the display unit 3 may rotate between a closed position in which the keyboard 5 is covered and an opened position in which the keyboard 5 is brought into a usable state. Both cases of the main unit 2 and display unit 3 are formed by dielectric materials such as a synthetic resin.

Moreover, an antenna 7 for radio communication for use, for example, in the wireless LAN (hereinafter "IEEE802.11b") is disposed in the display unit 3. In the IEEE802.11b, a direct sequence spread spectrum (DSSS) is used which is one of the radio communication standards using an industry science medical (ISM) band of a 2.4 GHz band and which is a spread spectrum system, and communication is possible at a maximum communication rate of 11 Mbps.

It is ideal to dispose the antenna 7 in a high position in order to improve reception sensitivity. In the present embodiment, in consideration of situations in which the personal computer 1 is used, the antenna 7 of a flat plate type is disposed in an upper part of the display unit 3, which corresponds to the high position during use. A dielectric material 8 is also arranged near the antenna 7. The arrangement of the antenna 7 and the dielectric material 8 is described later.

The personal computer 1 has three radio modules 10a, 10b, and 10c mounted on the main unit 2. These radio modules 10a, 10b and 10c are for use in radio communication and have different frequency bands from one another. A user may selectively use one of these radio modules 10a, 10b, and 10c, to perform radio communication. It is to be noted that there are the following popular types of radio communications:

IEEE802.11b: 2.4 GHz band;

IEEE802.11a: 5 GHz band;

Bluetooth (R): 2.4 GHz band;

PDC: 800 MHz/1.5 GHz band;

GSM: 900 MHz/1.8 GHz/1.9 GHz band;

IS-136: 800 MHz/1.9 GHz; and

CdmaOne(R): 800 MHz.

Among these, IEEE802.11b and IEEE802.11a are communication standards of the radio LAN determined by an "IEEE802.11" working group. Bluetooth(R) is the communication standard of a short-distance radio communication system. The PDC, GSM, IS-136, and CdmaOne(R) are the communication standards of a mobile radio communication system.

In this embodiment, the radio module 10b is of the IEEE802.11b, and the radio modules 10a and 10c are for wireless communication using, for example, 2.6 GHz band and 2.25 GHz band respectively. The antenna 7 is used in common to the respective radio modules 10a, 10b, and 10c mounted on the personal computer 1.

Figure 2:
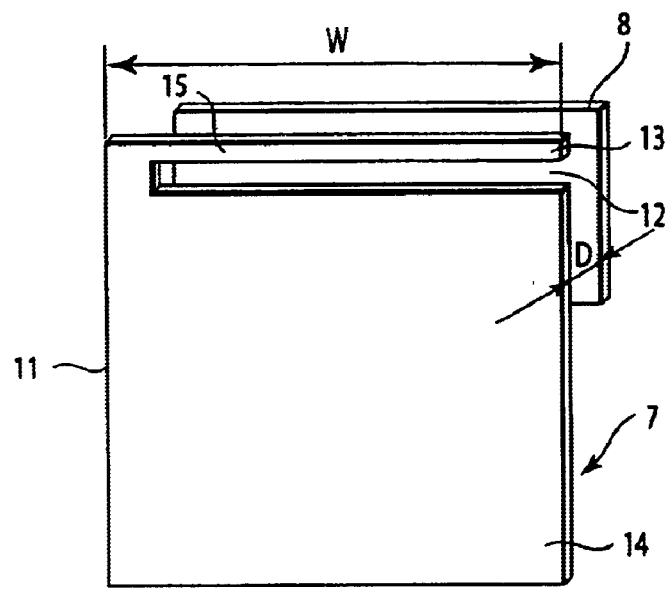
FIG. 2 is a perspective view showing a positional relationship between an antenna and a dielectric material, according to the first embodiment.

As shown in FIG. 2, the antenna 7 is an inverted F-shaped antenna. The inverted F-shaped antenna 7 has, for example, a rectangular antenna substrate 11, a groove 12 disposed along an upper side of the substrate to form an element 13 which is a radio wave radiation element in the upper side of the antenna substrate 11, and another region 14 formed as a ground (GND). Moreover, the element 13 includes a power supply point 15 disposed in a position near a base portion thereof. In this case, the position of the power supply point 15 is set so that impedance in the point indicates, for example, 50 Ω.

For the antenna substrate 11, a metal plate having a thickness, for example, of about 0.1 mm is used, and the opposite surfaces of the substrate are laminate-treated and protected. A width W of the antenna substrate 11 is set substantially to a ¼ wavelength (λ) of the wavelength (λ) of a desired frequency. A concrete size of the antenna substrate 11 is about 30×30 mm, for example, when radio waves of a 2.4 GHz band are used. Moreover, the groove 12 has a width of about 2 mm, and the element 13 has a width of about 1 mm.

The dielectric material 8 disposed near the antenna 7 is rectangular, and is formed, for example, by a synthetic resin. This dielectric material 8 is movable in a vertical direction with respect to one plane side of the antenna 7. When an interval between the dielectric material 8 and antenna 7 is set to D, a resonance frequency of the antenna 7 is determined in accordance with the length of D.

Figure 3:
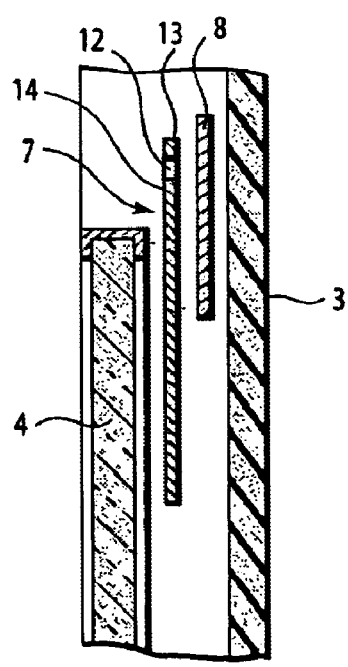
FIG. 3 is a cross-sectional view showing the antenna and the dielectric material mounted on a display unit, according to the first embodiment.

The antenna 7 is, as shown in FIG. 3, fixed to the upper portion inside the display unit 3 using adhesives. In this case, the antenna 7 is disposed while a side with the element 13 formed thereon is projected upwards from the upper end of the LCD panel 4 by a predetermined width (e.g., about 5 to 6 mm). This prevents transmission/reception of radio waves by the element 13 from being influenced by the LCD panel 4.

Moreover, the location of the dielectric material 8 is on one plane side of the antenna 7 so as to be movable by a movement mechanism described later. The dielectric material 8 has a size sufficient to include at least a radio wave radiation portion formed in the upper end of the antenna 7. Thus, the radio wave radiation portion of the antenna 7 is easily influenced by the permittivity of the dielectric material 8.

Here, for example, when the dielectric material 8 is positioned relatively close to the antenna 7, the resonance frequency of the antenna 7 is at a relatively low frequency which frequency depends on the permittivity of the dielectric material 8. On the other hand, when the dielectric material 8 is moved further away from the antenna 7, and the interval D between the antenna 7 and dielectric material 8 increases, the influence of the permittivity of the dielectric material 8 onto the antenna 7 decreases. Therefore, the resonance frequency of the antenna 7 moves to a high frequency.

Figure 4:
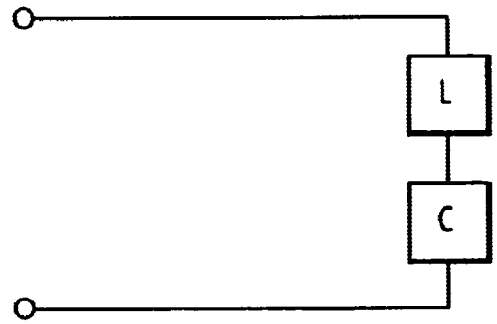
FIG. 4 is a diagram showing a equivalent circuit relating to a frequency characteristic of the antenna, according to the first embodiment.

The antenna 7 may be represented by a series circuit of a coil L and capacitor C shown in FIG. 4. An inductance of the coil L is determined by the length of the element 13 of the antenna 7 and the position of the power supply point 15.

A resonance frequency $f_0$ of the antenna 7 is represented by:

$$f_0 = 1/(2\pi\sqrt{LC}) \qquad (1)$$

Moreover, the capacitor C is represented by:

$$C = \epsilon_r \epsilon_0 (S/d) \qquad (2)$$

Here, $\epsilon_r$ denotes a relative permittivity, $\epsilon_0$ denotes the permittivity in vacuum, d denotes a distance between polar plates of the capacitor, and S denotes a polar plate area.

Now, when the dielectric material 8 is brought close to the antenna 7, $\epsilon_r$ of the above equation (2) increases. That is, when the interval D between the antenna 7 and dielectric material 8 is short, the relative permittivity $\epsilon_r$ increases.

With the increase of $\epsilon_r$, the resonance frequency $f_0$ lowers by the above equation (1).

Figure 5A:
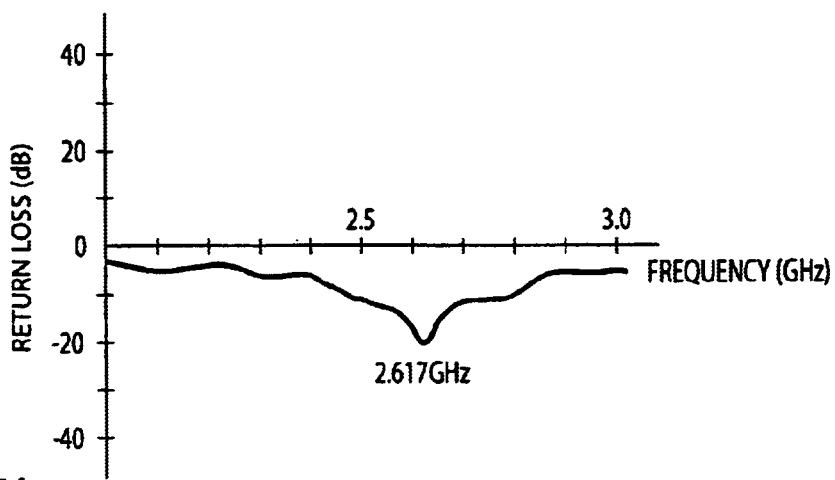
FIGS. 5A to 5C are diagrams showing the resonance frequency of the antenna, according to the first embodiment.
Figure 5B:
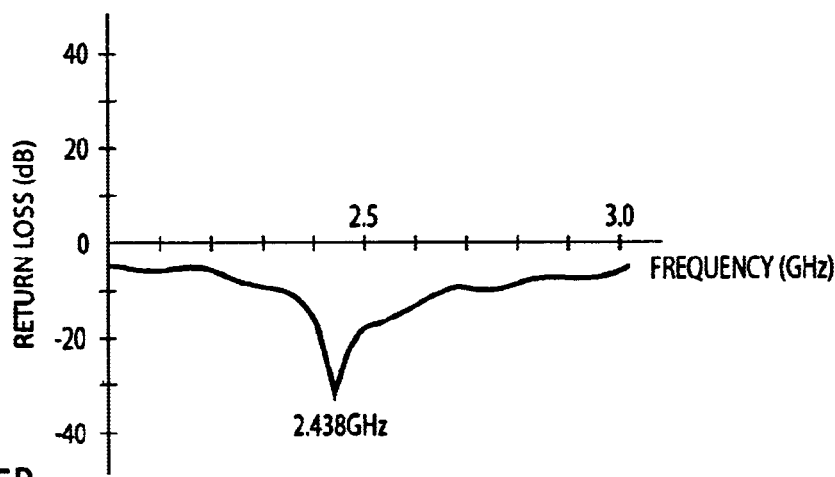
Figure 5C:
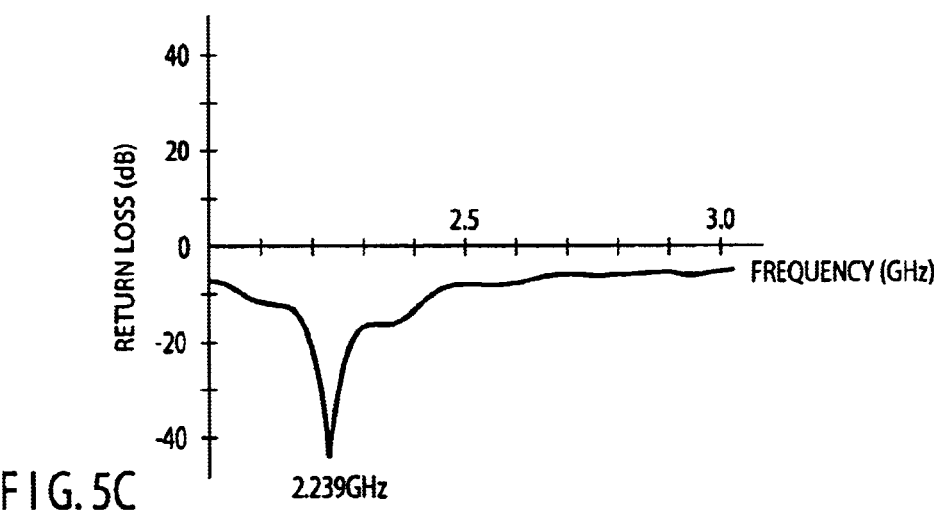

In FIGS. 5A to 5C, an abscissa indicates the frequency [GHz], and an ordinate indicates a return loss of the radio wave [dB]. A frequency band in which the return loss becomes minimum is the resonance frequency of the antenna 7 at this time.

FIG. 5A shows that when a distance between the antenna 7 and dielectric material 8 is not less than a predetermined distance, the dielectric material 8 does not influence the antenna 7, and the antenna characteristics are substantially of a single unit of the antenna 7.

FIG. 5B shows that the interval D between the antenna 7 and dielectric material 8 is 1 mm.

FIG. 5C shows that the interval D between the antenna 7 and dielectric material 8 is 0 mm, i.e., the dielectric material 8 is closely attached to the antenna 7.

As shown in FIG. 5A, the resonance frequency of the antenna 7 is 2.617 GHz in a case in which the frequency is not influenced by the dielectric material 8. Under this arrangement, the antenna 7 is used for the radio module 10a.

On the other hand, with the influence of the dielectric material 8, the resonance frequency of the antenna 7 fluctuates in accordance with the interval D between the antenna 7 and dielectric material 8. That is, the shorter the interval D is, the lower the resonance frequency becomes. In this example, as shown in FIG. 5B, the frequency is 2.438 GHz with the interval D of 1 mm, and as shown in FIG. 5C, the frequency is 2.239 GHz with the interval D of 0 mm. Under the arrangement shown in FIG. 5B, the antenna 7 is used for the radio module 10b. On the other hand, the antenna 7 is used for the radio module 10b under the arrangement shown in FIG. 5C.

In this manner, the resonance frequency of the antenna 7 is determined in accordance with the interval D between the antenna 7 and dielectric material 8. The position of the dielectric material 8 is adjusted by a movement mechanism 21, for example, as described with FIGS. 6A and 6B.

Figure 6A:
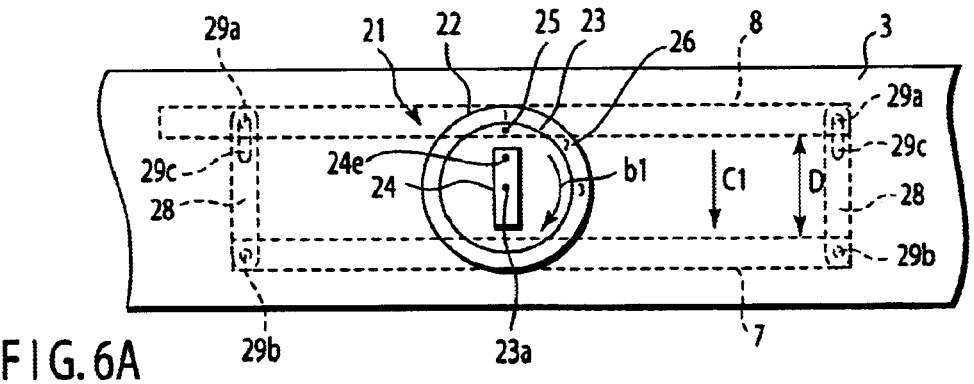
FIGS. 6A and 6B are diagrams showing a movement mechanism which moves the dielectric material toward the antenna while maintaining a parallel orientation to the antenna, according to the first embodiment.

As shown in FIG. 6A, the movement mechanism 21 includes a circular graduated plate 22, a circular rotary plate 23 which rotates on the graduated plate 22, and a handle 24 disposed on the rotary plate 23. The graduated plate 22 is fixed to the upper end of the display unit 3 by the adhesives. The rotary plate 23 rotates about a shaft 23a which is a support point and is secured to the display unit 3. The rotary plate 23 is slidably attached to a center point 25 of the dielectric material 8. The handle 24 is used as an operation point for moving the dielectric material 8.

In this constitution, when a user manually operates the handle 24 to rotate the rotary plate 23 along a direction indicated by arrow b1, the dielectric material 8 moves toward the antenna 7 as shown by arrow c1. The one end 24e of the handle 24 moves along the circular graduated plate 22. In the meantime, the dielectric material 8 is guided by a guide mechanism 28 disposed inside the display unit 3 to move toward antenna 7 while maintaining a parallel orientation to the antenna 7. The interval D between the antenna 7 and dielectric material 8 is narrowed by movement of the dielectric material 8 in the direction of the arrow c1. Thereby, the resonance frequency band of the antenna 7 is adjusted toward a lower frequency.

The guide mechanism 28 is in the form of a link having an upper pin 29a, a lower pin 29b and a slot 29c. The upper pin 29a and lower pin 29b are connected to the dielectric material 8 and antenna 7 respectively, and pass through apertures in the link 28 so that these pins may rotate within the link apertures. Moreover, the upper aperture is elongated to take the form of a slot 29c through which the upper pin 29a may slide as the dielectric material 8 is moved closer to or further away from the antenna 7. The pins 29a and 29b have flared end so as not to become detached from the link 28 during rotation. In this manner, the dielectric material 8 may be moved away from and toward one side of the antenna 7, while all the while maintaining the dielectric material 8 oriented parallel to the antenna 7.

Graduations 26 are shown as "1", "2", and "3", and attached along a circumferential direction in an outer periphery of the graduated plate 22. Each of "1", "2", and "3" is positioned at a appropriate place corresponding to the frequency bands of the plurality of radio modules 10a, 10b, and 10c mounted on the personal computer 1. For example, when the one end 24e of the handle 24 faces "2" of the graduations 26, the interval D is fixed at a proper position for use of the radio module 10b.

Thus, the user may use these graduations 26 as measures to easily perform a frequency adjustment operation. The rotary plate 23 includes a structure which is rotatable in stages for each of these graduations 26.

Figure 6B:
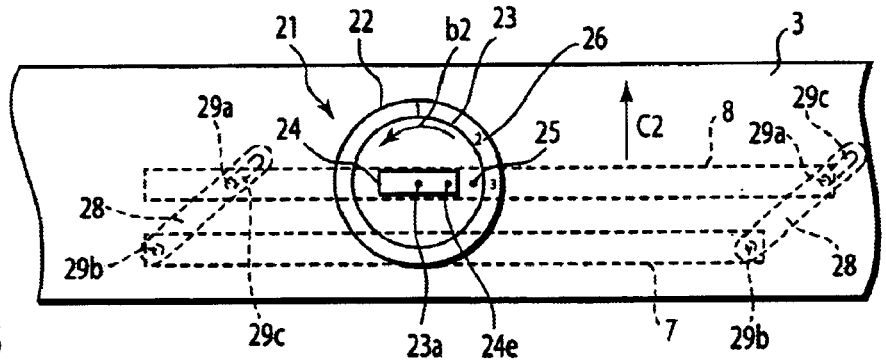

FIG. 6B shows that the rotary plate 23 has been rotated to a third graduation position "3". In this state, when the rotary plate 23 is rotated in the direction indicated by arrow b2, the dielectric material 8 moves in the direction indicated by arrow c2. Thereby, the resonance frequency band of the antenna 7 is adjusted toward a high frequency.

When the dielectric material 8 is moved respectively with the antenna 7 in this manner, the resonance frequency band of the antenna 7 may be switched. Therefore, all the frequency bands of the respective radio modules 10a, 10b, and 10c may be covered only with one antenna 7. In this case, the resonance frequency band of the antenna 7 is constituted to be appropriately switched by the movement of the dielectric material 8. Therefore, the shape of the antenna 7 is simple as compared with a structure in which a plurality of resonance frequency bands have heretofore been imparted to the antenna 7. Moreover, a usable frequency band is broader.

It is to be noted that in the examples of FIGS. 6A and 6B, the movement of the dielectric material 8 in three stages has been described, but it is also possible to move the material more finely.

Figure 7:
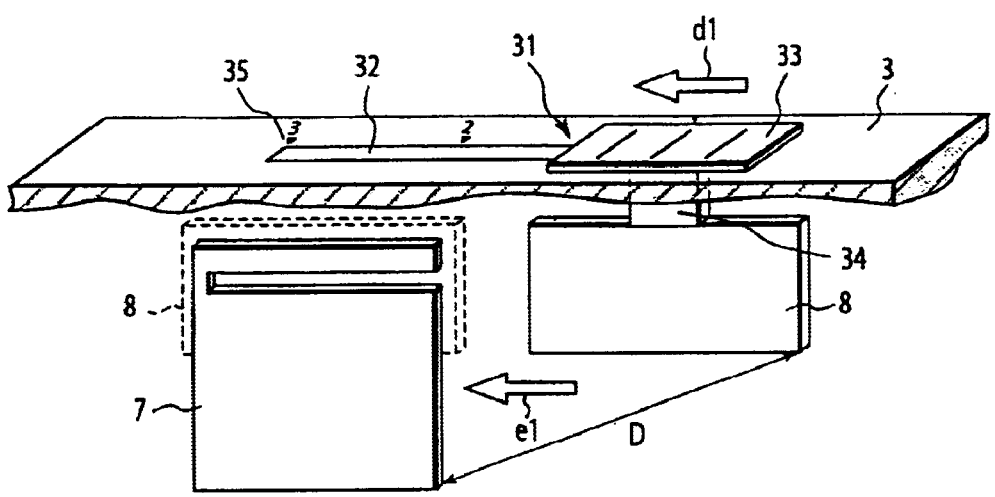
FIG. 7 is a diagram showing a movement mechanism which moves the dielectric material in a horizontal direction with respect to the antenna, according to a second embodiment of the present invention.

Next, a second embodiment will be described. In this embodiment, a movement mechanism 31, as shown in FIG. 7, is different from that in the first embodiment, and the dielectric material 8 is moved in a horizontal direction with respect to the plane of the antenna 7. The resonance frequency band of the antenna 7 may be adjusted in the same manner as described in first embodiment.

The movement mechanism 31 includes a slide hole 32, a operating portion 33 hanging over the slide hole 32, and a support member 34 attached to the operation portion 33 and going through the slide hole 32. The operating portion 33 serves as a kind of handle, operated by a finger of an operator. The slide hole 32 is formed in a longitudinal direction with respect to the antenna. 7 in the upper end of the display unit 3. The operation portion 33 is attached for sliding movement along the slide hole or slit 32. The support member 34 extends from the bottom portion of the operation portion 33, and supports the dielectric material 8 via the slide hole 32.

In this constitution, when the user moves the operation portion 33 in a direction indicated by arrow d1, the dielectric material 8 moves in a direction indicated by arrow e1 via the support member 34. Thereby, the interval D between the antenna 7 and dielectric material 8 is narrowed, and the resonance frequency band of the antenna 7 is adjusted toward the low frequency. Moreover, when the operation portion 33 is moved in a direction opposite to the direction of arrow d1, the dielectric material 8 is removed from the antenna 7, and the resonance frequency band of the antenna 7 is adjusted toward the high frequency.

Graduations 35 are shown as "1", "2", and "3", and are attached along the slide hole 32 in the vicinity of the slide hole 32. Each of "1", "2", and "3" is positioned at a appropriate area corresponding to the frequency bands of the plurality of radio modules 10a, 10b, and 10c mounted on the personal computer 1. The user may use these graduations 35 as the measures to easily perform the frequency adjustment operation. The operation portion 33 includes a structure which is slidable in stages for each of these graduations 35.

It is to be noted that in the example of FIG. 7, the movement of the dielectric material 8 in three stages has been described, but it is also possible to move the material more finely.

Even in the constitution in which the dielectric material 8 is moved in the horizontal direction with respect to the plane of the antenna 7 in the manner of FIG. 7, the resonance frequency of the antenna 7 varies in accordance with the position of the dielectric material 8. Therefore, all the frequency bands of the respective radio modules 10a, 10b, and 10c mounted on the personal computer 1 may be covered.

It is noted that the interval D shown in FIGS. 6A and 6B and the interval D shown in FIG. 7 both define a distance between the dielectric material 8 and the antenna 7. More precisely, the interval D in FIGS. 6A and 6B defines a perpendicular distance between the plane of a surface of the dielectric material and the plane of a surface of the antenna. In FIG. 7 the interval D defines a transverse distance between any one point on the dielectric material and any one point on the antenna. In this case, the perpendicular distance between the plane of the dielectric and the plane of the antenna is a constant. The effect of moving the antenna is to change the effective area S in equation (2) of the equivalent polar plate, thereby enabling a change in the capacitor value and resulting change in frequency per equation (1).

Next, a third embodiment will be described.

The feature of the third embodiment is that the position of the dielectric material 8 is automatically adjusted.

Figure 8:
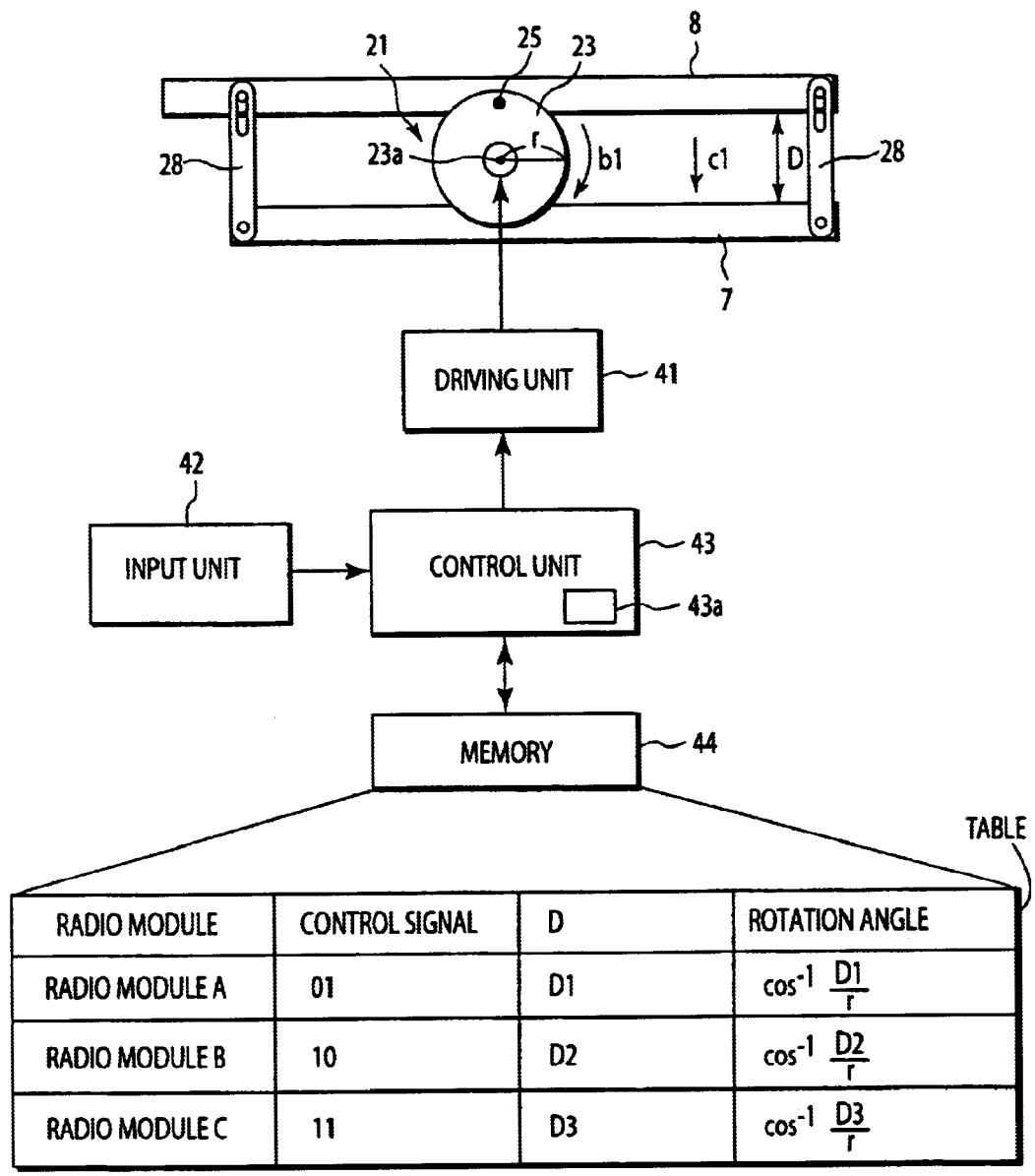
FIG. 8 is a block diagram showing an electronic apparatus with a driving unit for changing an interval between the antenna and the dielectric material, according to a third embodiment of the present invention.

As shown in FIG. 8, the dielectric material 8 is disposed to be movable with respect to the antenna 7 in the same manner as in the first embodiment.

The rotary plate 23 has a radius r, and rotates on the shaft 23a which is the support point. The rotary plate 23 is slidably attached to the center point 25 of the dielectric material 8. When the rotary plate 23 rotates in the direction indicated by arrow b1, the dielectric material 8 is guided by the guide mechanism 28 to move in the direction indicated by arrow c1 while being parallel to the antenna 7. Moreover, when the rotary plate 23 rotates in a direction opposite to the direction indicated by arrow, the dielectric material 8 moves in a direction opposite to the direction indicated by arrow c1.

The personal computer 1 in the third embodiment includes a driving unit 41, input unit 42, control unit 43, and a memory 44 which stores a table.

The driving unit 41 rotates/drives the rotary plate 23 based on a control signal outputted from the control unit 43. The input unit 42 is disposed to input a selection signal of the radio module, and may include, for example, the keyboard 5 shown in FIG. 1.

The control unit 43 includes a microprocessor and a memory 43a for storing a program. On receiving the selection signal of the radio module from the input unit 42, the control unit 43 refers to the table in the memory 44 to control the position of the dielectric material 8. The table stores data corresponding to a control signal S, the length of the interval D between the antenna 7 and dielectric material 8, and information indicating a rotation angle of the rotary plate 23, for each of the modules 10a, 10b, and 10c.

Next, an operation of the third embodiment will be described, referring FIG. 9. It is to be noted that the control unit 43 reads the program from the memory 43a to execute a process shown in the flowchart.

It is now assumed that three types of radio modules 10a, 10b, 10c different in frequency band from one another are mounted on the personal computer 1. The user may select any one from these radio modules 10a, 10b, and 10c, for example, on a menu screen (not shown) to perform radio communication.

When the radio module for use in the radio communication is selected (YES in step S11), the selection signal (signal indicating the radio module selected by the user) is given to the control unit 43 through the input unit 42. Thereby, the control unit 43 first identifies the radio module brought in a use state based on the selection signal (step S12). It is to be noted that the use state of each radio module may also be judged from a starting state of an operating system (OS) or driver as resulting from a transmit or receive command of an application program being executed. That is, the selection and module identity may take place automatically by execution of a transmit or receive command in a given application program.

Here, when the radio module 10a is brought into the use state (YES in step S13), the control unit 43 refers to the table in the memory 44 to judge the position of the dielectric material 8 for the radio module 10a (step S14). In an example of the table shown in FIG. 8, the position of the dielectric material 8 is D1 with respect to the radio module A, and a control signal for that is "01". Therefore, when the control unit 43 outputs the control signal "01" to the driving unit 41, the rotary plate 23 is rotated only by a predetermined angle (step S15), and the interval between the antenna 7 and dielectric material 8 is adjusted to D1 (step S16).

This also applies, when the radio module 10b or 10c is brought into the use state.

That is, with the radio module 10b (YES in step S17), the control unit 43 refers to the table in the memory 44 to output a control signal "10" to the driving unit 41, and thereby the interval between the antenna 7 and dielectric material 8 is adjusted to D2 (steps S18 to S20). Moreover, with the radio module 10c (YES in step S21), the control unit 43 refers to the table in the memory 44 to output a control signal "11" to the driving unit 41, and thereby the interval between the antenna 7 and dielectric material 8 is adjusted to D3 (steps S21 to S24).

The interval D between the antenna 7 and dielectric material 8 is automatically adjusted in accordance with the use state of each radio module in this manner. Therefore, unless the user performs the frequency adjustment operation as in the first embodiment, the resonance frequency of the antenna 7 may be switched for each of the respective radio modules.

Moreover, the case in which the dielectric material 8 is moved in the vertical direction (vertical as shown in FIGS. 6A and 6B) with respect to the antenna 7 has been assumed and described. However, the automatic operations of FIGS. 8 and 9 may readily be applied in the case in which the movement mechanism 31 shown in FIG. 7 moves the dielectric material 8 in the horizontal direction with respect to the antenna 7. In this case, instead of storing the rotation angle in the table of FIG. 8, a translation distance is stored. This distance can be either positive or negative to indicate the direction of travel of the dielectric 8 to the right or left as shown in FIG. 7.

Figure 10:
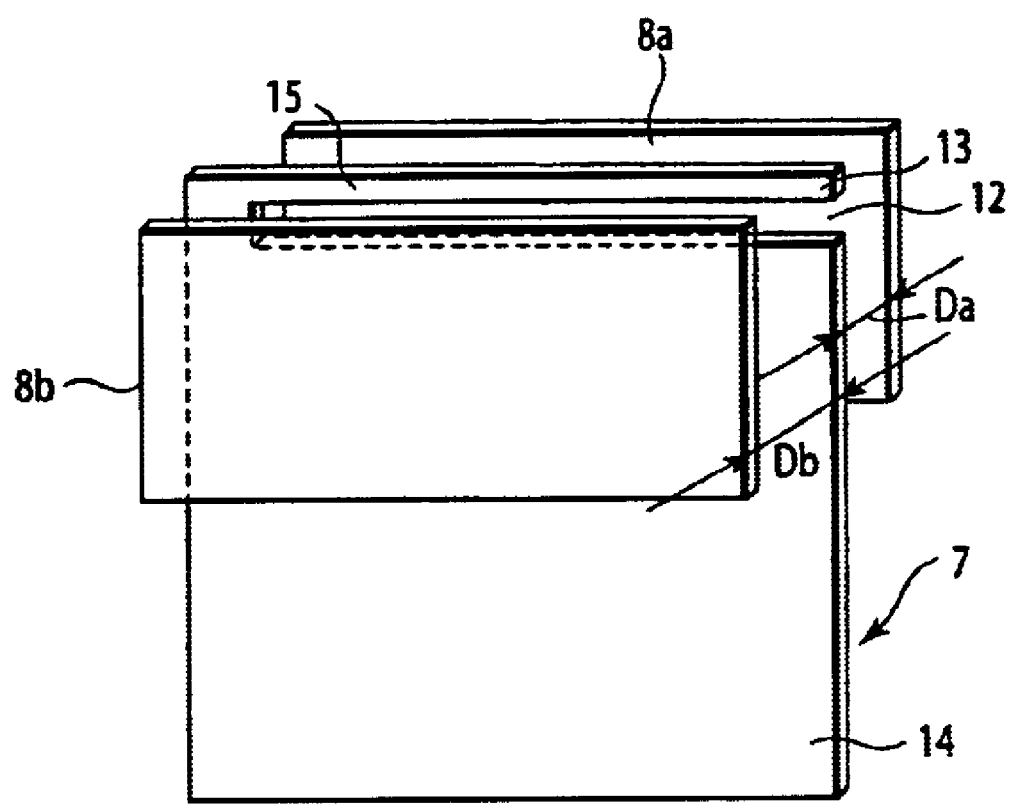
FIG. 10 is a perspective view showing a fourth embodiment in which a positional relationship between an antenna and two dielectric materials, according to a fourth embodiment of the present invention.

Furthermore, in the first, second, and third embodiments, the dielectric material 8 is disposed only on one plane side of the antenna 7. However, as shown in FIG. 10, a fourth embodiment is possible in which a constitution may be used in which dielectric materials 8a, 8b are disposed on opposite plane sides of the antenna 7 and the dielectric materials 8a, and 8b are supported by the movement mechanism 21 or 31 to be movable with respect to the antenna 7. In this constitution, the resonance frequency band of the antenna 7 is determined by an interval Da between the antenna 7 and dielectric material 8a and an interval Db between the antenna 7 and dielectric material 8b.

In this case, for example, if the intervals Da, Db of the dielectric materials 8a, 8b may be adjusted independently of each other, the switching of even more resonance frequencies can be realized.

The description of the first, second, and third embodiments are hereby incorporated by reference as being directly applicable to the fourth embodiment. Thus, the fourth embodiment may directly utilize the rotary mechanism of the first embodiment, the slide mechanism of the second embodiment and the automatic mechanism (as applied to either the rotary or slide implementations) of the third embodiment.

Moreover, even when the intervals Da, Db may be adjusted in a linked manner, a relative permittivity increases with the use of two dielectric materials. Therefore, it is possible to enlarge the adjustment band of the resonance frequency, and the switching of further more resonance frequencies can be realized.

Figure 11:
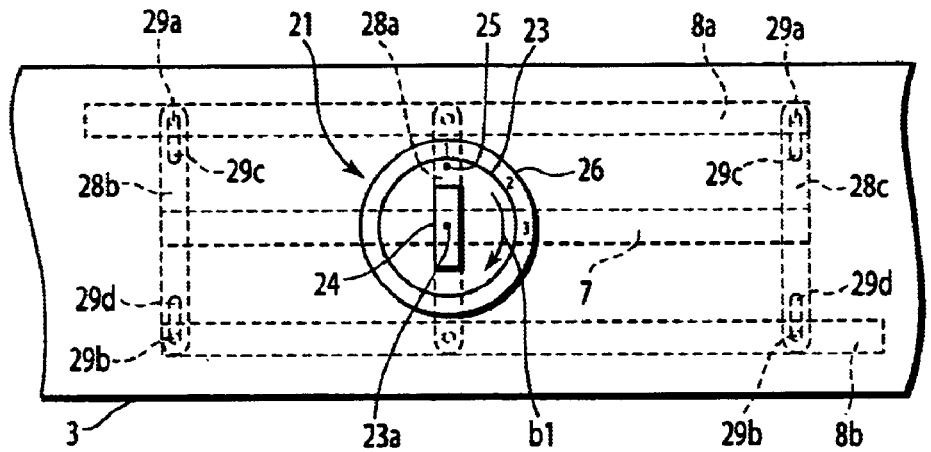
FIG. 11 is diagrams showing a movement mechanism which moves two dielectric materials together, according to a fifth embodiment of the present invention.

As shown in FIG. 11, according to a fifth embodiment, it is possible to relatively move both the dielectric materials 8a, and 8b with respect to the antenna 7 by manually operating the handle 24. The movement mechanism 21 has three links 28a, 28b, and 28c which are connecting between the dielectric material 8a and 8b. The center portion of the link 28a is fixed to the shaft 23a. Thus, three links 28a, 28b, and 28c rotate in accordance with the rotation of the handle 24. In this case, each of links 28a, 28b and 28c have upper pin 29a and lower pin 29b and upper slot 29c as in FIGS. 6A and 6B. In addition, a lower slot 29d is provided in each link so that both the upper dielectric material 8a and the lower dielectric material 8b may move toward and away from the antenna while all the while maintaining a parallel orientation with respect to the antenna 7.

While not specifically illustrated, it is or course possible to utilize two dielectric materials as in FIG. 11 which are independently moveable. This may simply be achieved by repeating the structure already shown in connection with FIGS. 6A and 6B, and thus providing two rotary plates (23) and two handles (24) and appropriate links (28) connecting each dielectric material separately to opposite sides of the antenna 7. Such an arrangement will provide greater choices of frequency selection than if the dielectric materials are mechanically connected for coordinated movement as shown in FIG. 11.

Figure 12:
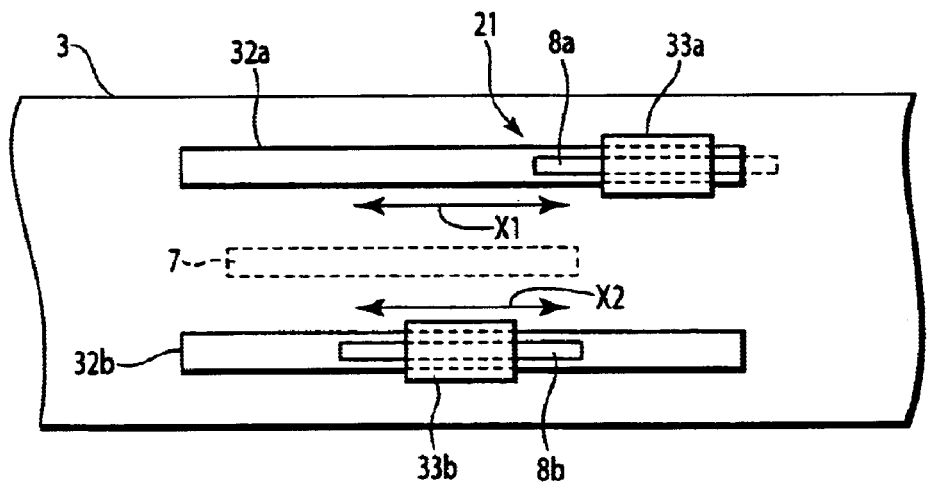
FIG. 12 is diagrams showing a movement mechanism which moves two dielectric materials independently, according to a sixth embodiment of the present invention.

FIG. 12 shows a sixth embodiment in which the dielectric material 8a, and 8b are capable of moving independently. The dielectric material 8a, and 8b connect with operating portions 33a, and 33b through the slide holes 32a, and 32b, respectively. Therefore, the dielectric material 8a is moved in the direction indicated by arrow x1, and the dielectric material 8b is moved in the direction indicated by arrow x2, independently from each other. Of course, it is possible to rigidly connect operating portions 33a and 33b together so that they move together a single unit. This may easily be done by providing a linking arm (not shown) rigidly connected to both operating portions 32a and 32b. Clearly more frequency section options are available by maintaining the operating portions independently moveable. Graduations (not shown) similar to those shown in FIG. 7, may of course be provided to assist the user in making the desired frequency selection appropriate to the radio module desired to be used.

Furthermore, with application of automatic adjustment described in the third embodiment, information indicating the control signal for each of the respective radio modules and the intervals Da, Db between the antenna 7 and dielectric materials 8a, 8b are set in the table. Thereby, it is possible to adjust the resonance frequency of the antenna 7 in accordance with the use state of each radio module.

Figure 9:
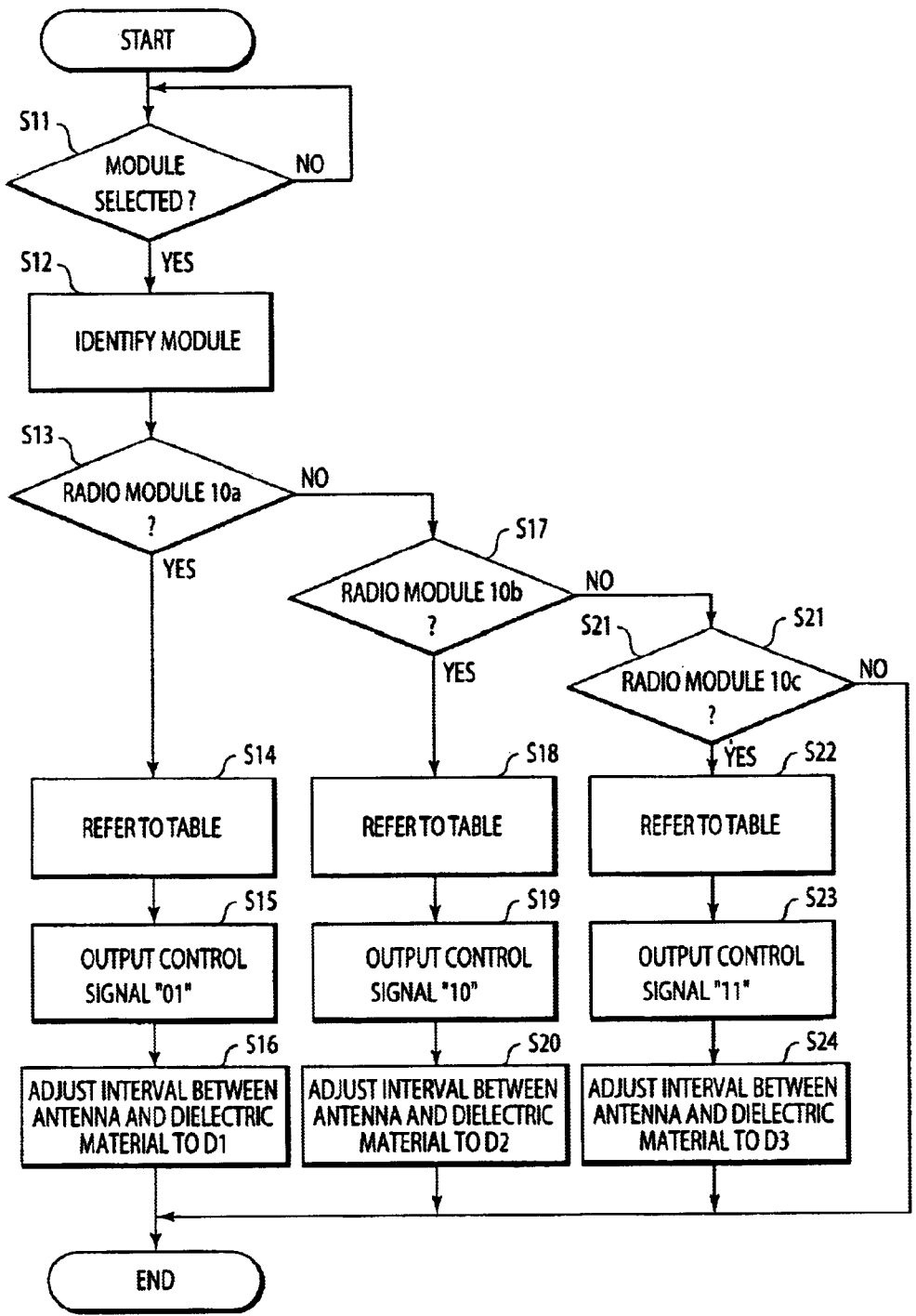
FIG. 9 is a flowchart showing a position control of the dielectric material, according to the third embodiment.

A process procedure at this time is similar to that of FIG. 9. That is, first, the control unit 43 identifies the radio module for use in the communication in the respective radio modules. Next, the control unit 43 obtains the position information of the dielectric materials 8a, and 8b for the identified radio module from the table. Next, the control unit 43 drives/controls each movement mechanism to move the respective dielectric materials 8a, and 8b to predetermined positions based on the position information of the dielectric materials 8a, 8b. Thereby, the resonance frequency of the antenna 7 is automatically adjusted.

Moreover, the inverted F-shaped antenna has been described as the example of the antenna 7, but it is not limited to this. For example, other antennas such as a dipole antenna, helical antenna, and slot antenna may also be used.

Furthermore, the electronic apparatus of the present invention is not limited to the personal computer, and may be applied to all electronic apparatuses such as a cellular phone as long as the electronic apparatuses require the antenna for the radio communication.

Moreover, the number of the radio module is not limited to three. It is possible to be two, or four or more. Also, each type of the radio module 10a, 10b, and 10c is not limited to that described in the embodiments. The radio module 10a, 10b, and 10c may be CdmaOne(R), IEEE802.11b, and PDC, respectively, as long as the frequency band is within the range of variable resonance frequency. It depends on the selected antenna, the dielectric material, and the interval therebetween.

It is also possible, of course, to move the antenna and keep the dielectric material fixed or to move both the antenna and the dielectric material to bring them closer together and further apart from one another. The relative movement of the dielectric material with respect to the antenna is the important factor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
   a first radio module configured to use a first frequency band;
   a second radio module configured to use a second frequency band which is different from the first frequency band;

an antenna coupled to both said first radio module and said second radio module;

a dielectric material; and a mechanism configured to relatively move said dielectric material with respect to said antenna so that an interval between said antenna and said dielectric material is changed between a first interval for said first radio module and a second interval for said second radio module.

2. An electronic apparatus according to claim 1, wherein the antenna is a flat plate type having a planar surface, and said dielectric material is disposed on one side of said planar surface.

3. An electronic apparatus according to claim 2, wherein said mechanism is operable for changing a perpendicular distance between a plane containing a surface of said dielectric material and said one side while maintaining said dielectric material parallel to said one side.

4. The electronic apparatus according to claim 2, wherein said mechanism is operable for moving said dielectric material along a direction parallel to said one side.

5. An electronic apparatus according to claim 2, further comprising:

a second dielectric material disposed on the other side of said planar surface, wherein said mechanism is operable for moving both said first dielectric material and said second dielectric material relative to said antenna.

6. An electronic apparatus according to claim 5, wherein said mechanism is operable for moving said first and second dielectric materials in one of (1) an independent manner or (2) a co-operating manner.

7. An electronic apparatus according to claim 5, further comprising:

a driving device coupled to said mechanism for moving said dielectric material and said second dielectric material relative to said antenna; and a control device coupled to said driving device, for providing said driving device with a signal indicative of a driving amount of said driving device corresponding to a first interval between said first dielectric material and said antenna and a second interval between said second dielectric material and said antenna.

8. An electronic apparatus according to claim 7, further comprising an input device for inputting data indicative of the first and second intervals.

9. An electronic apparatus according to claim 8, wherein said control device includes a memory which stores a correspondence data between the data input by said input device and the driving amount.

10. An electronic apparatus according to claim 7, further comprising an input device for inputting a selection of said first radio module and said second radio module.

11. An electronic apparatus according to claim 10, wherein said control device is operable for providing said driving device with the signal corresponding to the selection input by said input device.

12. An electronic apparatus according to claim 11, wherein said control device includes a memory which stores a correspondence data between the selected radio module and the driving amount.

13. An electronic apparatus according to claim 1, wherein said mechanism includes a handle linked to said dielectric material.

14. An electronic apparatus according to claim 13, further comprising a graduation arranged to indicate an extent of movement of said handle.

15. An electronic apparatus according to claim 1, further comprising:

a driving device coupled to said mechanism; and a control device coupled to said driving device, for providing said driving device with a signal indicative of a driving amount of said driving device corresponding to an interval between said dielectric material and said antenna.

16. An electronic apparatus according to claim 15, further comprising an input device for inputting a data indicative of one of said first radio module and said second radio module.

17. An electronic apparatus according to claim 16, wherein said control device includes a memory which stores a correspondence data between the data input by said input device and the driving amount.

18. An electronic apparatus according to claim 1, wherein said first radio module is for use in a wireless LAN.

19. A method of operating a portable computing device having wireless communications for selecting between at least a first and a second radio module connected to said portable computing device, said first and second radio modules operating with a first and a second, different, radio frequency band and each utilizing an antenna, the method comprising the steps of:

operating said portable computing device utilizing said first module to effect wireless communications using said first frequency band;

relatively moving a dielectric material with respect to said antenna to enable optimization of wireless transmission/reception by said second radio module operating with said second frequency band.

* * * * *